United States Patent Office 3,211,251
Patented Oct. 12, 1965

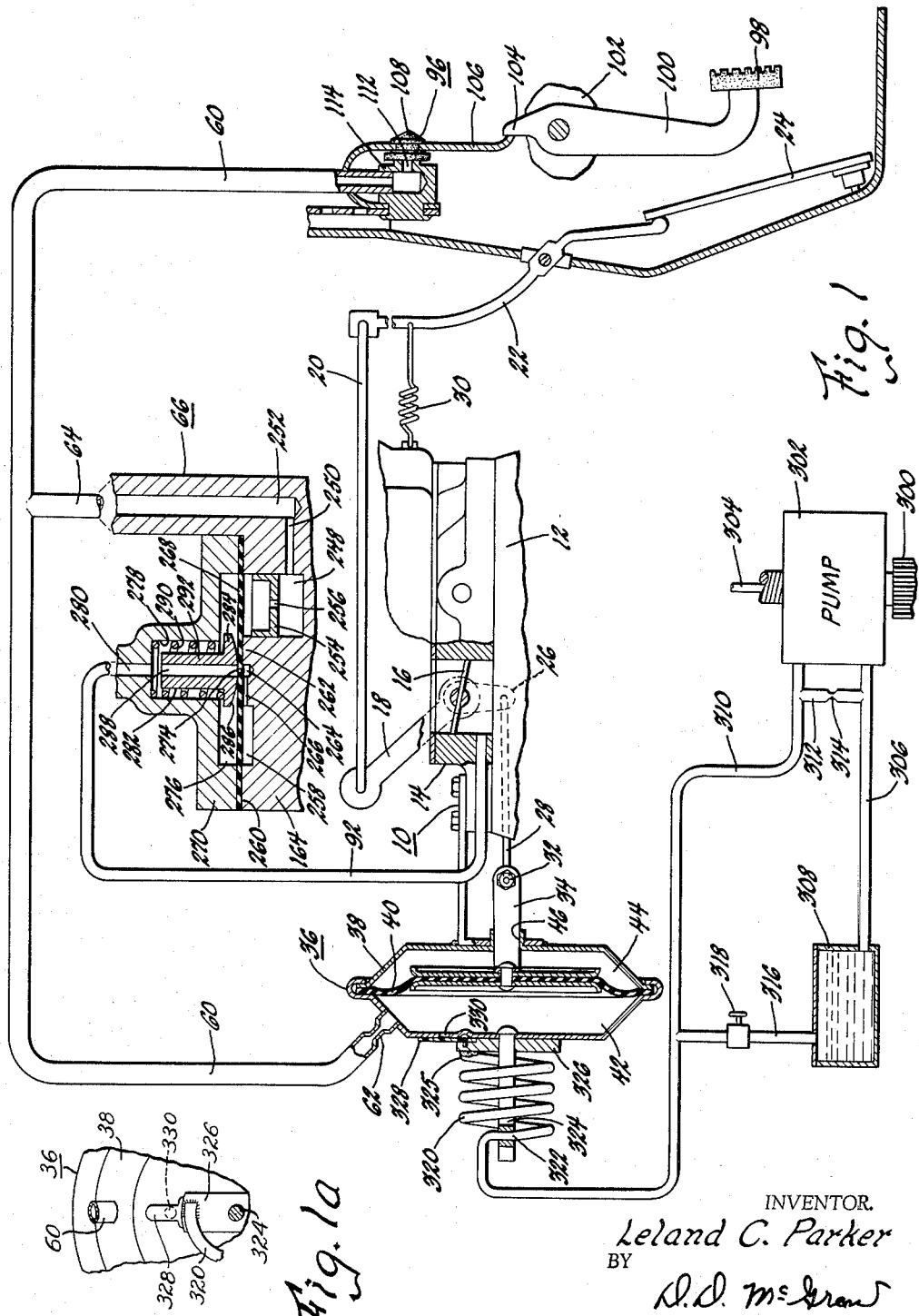

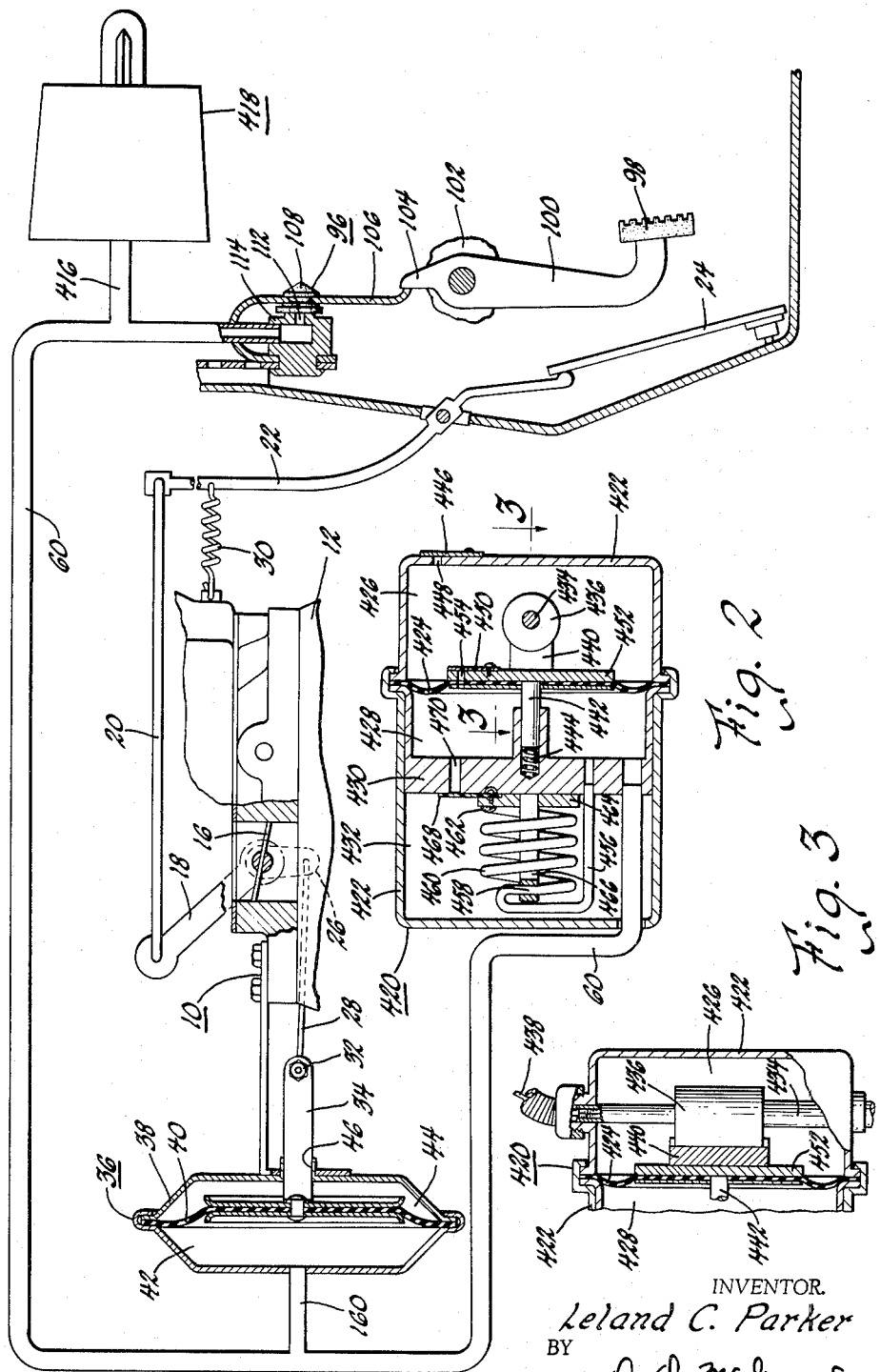

3,211,251
VEHICLE ROAD SPEED CONTROL SYSTEM
Leland C. Parker, Rochester, N.Y., assignor to General Motors Corporation, Detroit, Mich., a corporation of Delaware
Filed Apr. 24, 1962, Ser. No. 189,767
4 Claims. (Cl. 180—82.1)

The invention relates to a vehicle road speed control system and more particularly to a system wherein modulated control of the system is obtained by a pressure sensitive modulating valve acting to provide a control pressure to a servo connected to move the engine throttle, and to methods of obtaining the control pressure. The pressure for actuating the modulating valve is responsive to vehicle speed and is modified by a desired speed set valve. In accomplishing these results it is proposed to utilize a pressure sensitive device such as a Bourdon tube connected to actuate the modulating valve upon movement of the tube in response to pressure in the tube. The pressure in the tube may be a fluid under a positive pressure or under a negative pressure as compared to atmospheric pressure. The invention is disclosed in two types of systems, one wherein the pressure in the Bourdon tube is positive and in which a fluid such as oil may be used, and the other in which a fluid such as air is utilized at pressures below atmospheric. Each system uses a pressure generating mechanism driven in accordance with the speed of the vehicle. Each system utilizes a vehicle brake actuation control valve for releasing the system from the speed control condition of operation.

In the drawings:

FIGURE 1 is a schematic presentation of a speed control system embodying the invention and installed on an engine in a vehicle. Parts are illustrated as broken away and in section;

FIGURE 1a is a view of a portion of the system of FIGURE 1 showing a valve and having parts broken away and in section;

FIGURE 2 is a schematic illustration of a modified system embodying the invention with parts broken away and in section; and FIGURE 3 is a partial section view taken in the direction of arrows 3—3 of the pressure generating portion of the system of FIGURE 2.

The system of FIGURE 1 utilizes a pressure generating system for generating a positive pressure responsive to vehicle speed and controlling the system. The system is preferably installed in a vehicle to control the engine 10 and therefore control the vehicle speed. The engine is provided with an intake manifold 12 on which is mounted a carburetor 14 for introducing a suitable fuel-air mixture under control of throttle valve 16. A throttle link 18 connected to rotate throttle valve 16 is actuated through throttle links 20 and 22 by the accelerator pedal 24. The accelerator pedal 24 is controllable by the vehicle operator in the usual manner. A throttle link 26 is also provided, and may be a part of the existing throttle linkage, to which the servo throttle link control rod 28 is attached. A throttle return spring 30 is suitably attached to one of the throttle links so as to urge throttle valve 16 to a normally closed throttle position. Rod 28 is connected through an adjustable connection 32 to the arm 34 of the power servo 36. Servo 36 includes a housing 38 suitably secured to the engine 10. Housing 38 is divided by a diaphragm 40 into a control chamber 42 and an atmospheric chamber 44. The latter chamber is maintained at atmospheric air at all times through the opening 46 provided for the servo arm 34. Other suitable atmospheric air inlet means may be provided if desired.

A control pressure conduit 60 is secured to the housing 38 so that control pressure in conduit 60 may be impressed on diaphragm 40 through control chamber 42. A restriction 62 is provided in conduit 60 immediately adjacent control chamber 42. Conduit 60 is connected through a condit 64 to a negative feedback assembly 66 which is further described below. Conduit 60 is also connected to a brake pedal operated spoiler valve assembly 96 which will admit atmospheric pressure to control chamber 42 immediately, under positive control of the spoiler valve, by cancelling the control pressure in conduit 60 and venting that conduit to atmosphere. This renders servo 36 inoperative to control the engine throttle valve 16.

Valve assembly 96 is actuated when the vehicle operator engages the vehicle brakes through the brake pedal 98 and the brake lever 100. Lever 100 is illustrated as being pivotally mounted to a bracket 102 or other suitable portion of the vehicle body. The connections between brake lever 100 and the vehicle brake system are not illustrated since they are not pertinent to the invention. Lever 100 is provided with a detent 104 which is in engagement with a spoiler valve operating spring 106 to which the spoiler valve 108 is attached. This valve may be loosely recessed in spring 106 so that it can readily align its face with the mating face of orifice 112 formed in the spoiler valve block 114. The interior of valve block 114 is connected to control pressure conduit 60 and is maintained at the control pressure in conduit 60 so long as valve 108 is seated to keep orifice 112 closed. When the brake pedal 98 is depressed by the operator, detent 104 is moved to release the pressure of spring 106 holding ing valve 108 in the orifice closed position, and the spring moves the valve face away from the orifice 112 so that conduit 60 is vented to atmosphere through the orifice. This immediately vents control chamber 42 of servo 36 to atmosphere. Under this condition the throttle linkage return spring 30 will urge the throttle valve 16 toward the zero throttle position since there is no resisting force acting on diaphragm 40 to hold the throttle in the advanced position.

The negative feedback valve assembly 66 has an engine intake vacuum conduit 92 connecting the intake manifold with the passage 280 formed in the valve assembly cover 270. The passage 252 in valve assembly housing 164 is connected to conduit 64. A chamber 248 is also formed in housing 164 and the lower end thereof is connected with passage 252 by passage 250. Passage 250 is sufficiently large to permit fluid flow between chamber 248 and passage 252 without restricting that flow further in view of other passages and orifices to be described. An insert 254 is provided in an intermediate portion of chamber 248 so that it does not interfere with passage 250. A control-limiting orifice 256 is provided in insert 254 and connects the upper end 258 of chamber 248 with the lower portion thereof connecting with passage 250.

The chamber upper end 258 is formed in the face 260 of the side of housing 164 adjacent cover 270 and above the lower part of chamber 248 so that the portion of chamber end 258 adjacent the plane of the face is annular with a boss 262 extending through the center thereof. Boss 262 has a recess 264 formed therein and extending downwardly from the plane of face 260. A slot 266 is formed across one side of boss 262 so that it connects recess 264 with the chamber upper end 258. This slot may be formed in any suitable manner, but it has been found particularly desirable and practical to form it with a V cross section having a closely controlled cross section area. The area of slot 266 below the plane of face 260 will define an orfice having a smaller cross section area than limiting orifice 256. A diaphragm and gasket 268, preferably formed of Mylar, a polyester resin which is the reaction product of terephthalic acid and ethylene glycol, is received on face 260 and retained thereon by cover 270. This type of material is preferred due to its physical characteristics of strength and weight and coefficient of friction. It is obvious, however, that other materials capable of forming the functions of diaphragm 268 may be used. Diaphragm 268 is provided with an orifice 274 aligned with recess 264 and having a cross section area greater than the cross section area of slot 266 below face 260 but less than the cross section area of limiting orifice 256. When diaphragm 268 engages the boss 262 on the face 260 it closes the top of slot 266 so that the slot becomes effective as a control orifice.

A chamber 276 is provided in cover 270 and defined by that cover and diaphragm 268. It preferably has the same diameter as does the upper chamber end 258. A recess 278 is provided in cover 270 and connects with chamber 276 and the passage 280. A plunger 282 is received in recess 278. This plunger has a head 284 larger in diameter than recess 278 and extending into chamber 276 and having a spherical or similar curved section surface 286 engaging diaphragm 268. A passage 288 extends through plunger 282 along the axis thereof and is in alignment with orifice 274 and recess 264 to provide a fluid flow passage from passage 280 to orifice 274. A plunger spring 290 is received about the plunger shank 292 within recess 278 and is seated at the bottom of the recess adjacent passage 280. It acts against the back side of plunger head 284 to keep the plunger surface 286 in engagement with diaphragm 268 around orifice 274. Fuid pressure from passage 280 can therefore pass through recess 278 and into orifice 274 directly to the chamber upper end 258 when the diaphragm is not in engagement with boss 262, or from orifice 274 through recess 264 and the effective orifice formed by slot 266 and diaphragm 268 when the diaphragm engages face 260 of boss 262. Diaphragm 268 is therefore subject to pressure in chamber 258 and chamber 276 to move plunger 282 against the force of spring 290 and to adjust the diaphragm position in relation to boss 262. The slot orifice 266 is therefore the controlling orifice when diaphragm 268 engages boss 262. Orifice 274 is the controlling orifice when diaphragm 268 is spaced from boss 262 at about the full stroke limit of plunger 282. Diaphragm 268 has an intermediate series of positions wherein the effective controlling orifiice is the varying orifice section area of slot 266 together with the space between face 260 of boss 262 and the adjacent surface of diaphragm 268. The details of operation of this portion of the system are disclosed and described in the copending application Serial No. 115,539, entitled Speed Control System, filed June 7, 1961, now Patent No. 3,183,-993. Reference is therefore made to that application for details of operation and the disclosure of that application is hereby incorporated as if fully reproduced herein.

In order to sense the vehicle speed the speedometer cable transmission drive gear 300 is connected to drive a fluid pressure pump 302 with the speedometer drive cable 304 continuing from the pump to the vehicle speedometer. Pump 302 is connected by an input conduit 306 to the fluid reservoir 308. A pump output conduit 310 is also provided. A pump bypass line 312 connects conduits 306 and 310 and may be built into the pump body. An adjustable bypass orifice restriction 314 is located in bypass 312 to establish a desired output pressure in relation to a given pump speed. In normal operation this restriction need not be further adjusted after having once been calibrated to the pump. Another bypass line 316 connects pump output line 310 with the reservoir 308 through an adjustable valve 318. This valve is normally adjustable by the vehicle operator to set the desired speed at which the system is to control the throttle valve. Pump output line 310 is connected to the Bourdon tube 320 at one tube end 322 which is secured to a mount 324 attached to the servo housing 38 adjacent control chamber 42. The other end 325 of tube 320 is closed. It is therefore obvious that the pump output pressure is imposed on the coiled tube 320 and that the degree of opening of valve 318 affects the pressure exerted on tube 320. A rotatable plate 326 is attached to tube end 325 and rotates about mount 324 under movement occasioned by the expansion and contraction of Bourdon tube 320 resulting in movement of tube end 322. A flat valve 328, also preferably made of Mylar, is attached to rotating plate 326 and is in sliding engagement with a flat portion of housing 38 so that it will cover and uncover in varying degrees the orifice 330 connecting chamber 42 to the atmosphere. The operation of valve 328 is also illustrated in FIGURE 1a.

The Bourdon tube 320 is so designed that it will begin to move valve 328 to close orifice 330 at a predetermined pressure. This pressure is obtained in relation to the set speed by adjustment of valve 318 after calibrating restriction 314. The movement of valve 328 to start closing orifice 330 preferably occurs when the vehicle reaches a speed approximately five miles below the set speed. The closing of orifice 330 restricts admission of atmospheric air into chamber 42. Chamber 42 is connected to the intake manifold 12, which is a source of air under reduced pressure, and therefore is also subjected to a reduced pressure depending upon the amount of closure of orifice 330 as well as the operation of the negative feedback valve assembly 66. Diaphragm 40 will move to the left as seen in the drawing under influence of the reduced pressure in chamber 42 and atmospheric pressure in chamber 44. This causes throttle valve 16 to be opened further since the force of diaphragm 40 is transmitted through arm 34, rod 28 and link 26. This causes a further increase in vehicle speed so that Bourdon tube 320 is further expanded, causing valve 328 to entirely close orifice 330 and move to the other side of the orifice, where it begins to open the orifice.

As further movement of valve 328 opens orifice 330 to a greater extent the absolute pressure in chamber 42 increases due to the modulating effect of valve 328 on orifice 330 by atmospheric air modification. This increase in absolute pressure allows movement of diaphragm 40 to the right under influence of spring 30, letting the throttle valve 16 close slightly and holding the diaphragm 40 in a position so that the vehicle is maintained at the set speed. Should the actual vehicle speed increase slightly valve 328 will move to further open orifice 330, thereby increasing further the absolute pressure in chamber 42 and permitting further closure of the throttle valve 16 under the force of throttle return spring 30.

If the vehicle speed decreases slightly from the set speed, valve 328 will move to close orifice 330 to some extent, thereby decreasing the absolute pressure in servo chamber 42 and causing diaphragm 40 to move throttle valve 16 in the throttle opening direction to increase the vehicle road speed until the same control speed is again attained. As orifice 330 is closed to some extent in this manner, the absolute pressure in chamber 248 and its upper end 258 decreases, acting on diaphragm 268 to move the diaphragm toward the face of boss 262 so that the smaller orifice 266 becomes the controlling orifice which admits raw vacuum into chamber end 258, instead of orifice 274. The clearance between the lower surface of diaphragm 268 and face 260 of boss 262 decreases as this action occurs and a range of operation is attained wherein the net effect is the provision of a variable controlling orifice intermediate the sizes of orifices 266 and 274. Therefore, the action of orifices 266 and 274, diaphragm 278 and the pressures in chamber end 258 and chamber 276 provide a degenerative or negative feedback system which eliminates system hunting. Orifice 256, being larger than either of the orifices 266 and 274, has no effect on the pressure signal in various portions of the chamber 248 unless inlet diaphragm 268 is ruptured so as to accidentally provide an orifice having greater area than orifice 256. Orifice 256 would then become a controlling orifice which would permit operation of the system without any feedback characteristics and would slightly lower the control speed than the set speed.

The speed control mode of operation of the system may be temporarily interrupted at any time by the operation of the vehicle brake pedal. When the spoiler valve assembly 96 is actuated to introduce atmospheric pressure into chamber 42 of servo 36, throttle return spring 30 immediately returns the servo and the throttle valve 16 toward the zero throttle position. Orifice 112 and control pressure line 60 are sufficiently large to transmit the atmospheric pressure to chamber 42 even though raw intake manifold vacuum is present in conduit 92 up to the controlling orifice of the negative feedback valve assembly 66. If the spoiler valve 108 is held open until the vehicle speed decreases below the range of control sensitivity as determined by valve 328 when it first begins to close orifice 330 as above described, the valve 328 will not be able to control orifice 330 and the throttle will not resume its automatic operation until the vehicle operator has again brought the vehicle speed into the range of control sensitivity. If, however, the brake pedal 98 is released so that valve 108 is closed while the vehicle speed is still in the range of control sensitivity, the system will return the vehicle to the set speed. The operator can eliminate automatic operation of the system by opening valve 318 fully so that the pressure output of pump 302 is returned directly to the reservoir 308 without affecting Bourdon tube 320 sufficiently to move valve 328. In effect this sets the range of control sensitivity out of the vehicle speed range. Atmospheric pressure is therefore admitted to the servo chamber 42 through orifice 330 and is sufficiently unrestricted so as to prevent the servo from being actuated.

The system of FIGURES 2 and 3 utilizes a pressure generating system for generating a reduced pressure in relation to atmospheric pressure which is responsive to vehicle speed. The system is shown as installed on the engine 10 having a throttle valve 16 controlled by throttle links 18, 20 and 22 and accelerator pedal 24. The valve assembly 96 containing the spoiler valve 108 and connected to the control pressure conduit 60 is actuated by brake lever 100 in the same manner as before described. Conduit 60, which is the control pressure line, connects to the control chamber 42 of the servo 36 through conduit 160. Diaphragm 40 of servo 36 is connected to move throttle valve 16 toward the open throttle position through servo arm 34, control rod 28 and throttle link 26. Throttle return spring 30 urges the throttle valve toward the closed throttle position. The portion of the system of FIGURE 2 so far described is substantially identical to the system of FIGURE 1.

A speed set valve assembly 418 is connected to conduit 60 through conduit 416. This valve includes an orifice the opening of which is variably controlled to control the amount of atmospheric pressure which may enter conduit 416 and therefore chamber 42 through the valve. The larger the opening of valve 418, the higher is the set speed.

A speed sensing and feedback assembly 420 includes a housing 422 in which a diaphragm 424 is secured to divide the housing into chambers 426 and 428. A wall 430 further divides housing 422 to provide a chamber 432 adjacent chamber 428. The speedometer drive member 434 is suitably connected to a part of the vehicle such as the vehicle transmission so that rotation of the member is obtained in direct relation to the road speed of the vehicle. The drive member extends through chamber 426 and has a cam 436 attached thereto within that chamber so that the cam rotates with the drive member. The end 438 of the drive member may be connected to the usual vehicle speedometer. A cam follower 440 is secured to one side of diaphragm 424 and is urged into engagement with cam 436 by the rod 442 and the spring 444 which are mounted in a recessed boss on wall 330.

A suitable check valve 446 is provided on a part of housing 422 so that it controls air flow through orifice 448 formed through housing 422 and connecting chamber 426 with the atmosphere. Check valve 446 prevents flow into chamber 426 from the outside atmosphere and permits flow from chamber 426 to the atmosphere. A check valve 450 is secured to the cam follower mounting plate 452 on diaphragm 424 so that it controls orifice 454 extending through diaphragm 424 and plate 452. Check valve 450 permits flow from chamber 428 to chamber 426 and prevents flow in the opposite direction. Control pressure conduit 60 is also connected to chamber 428. A conduit 456 is connected at one end to chamber 428 and at the other end to a fixed end 458 of a Bourdon tube 460. Tube 460 is mounted in chamber 432 which is always at atmospheric pressure. The end 462 of tube 460 is closed and is attached to a rotatable plate 464 which rotates about the Bourdon tube mount 466 under movement occasioned by the expansion and contraction of Bourdon tube 460 resulting in movement of tube end 462. A flat valve 468, also preferably made of Mylar and generally similar to valve 328 of FIGURE 1, it attached to rotating plate 464 and is in sliding engagement with the surface of wall 430 exposed to chamber 432. Valve 468 will cover and uncover in varying degrees the orifice 470 formed through wall 430 and connecting atmospheric chamber 432 to chamber 428. The construction is generally similar to that illustrated in FIGURE 1a relating to valve 328. Thus movement of Bourdon tube end 462 transmitted to valve 468 controls the bleed of atmospheric air entering chamber 428 through orifice 470.

As cam 436 is rotated it moves diaphragm 424 to evacuate chamber 428 in proportion to the speed of the vehicle. This reduced pressure is transmitted through conduit 60 toward chamber 42 of servo 36. Until, however, the diaphragm pump evacuates chamber 428 at a sufficient rate to reduce the pressure in chamber 42 with valve 418 open to the extent necessary for the set speed, no force is exerted on diaphragm 40. The pumping rate of diaphragm 424 is determined by the vehicle speed and the effectiveness of the pumping action is determined by the amount of opening of the speed set valve 418. When the pumping rate is sufficiently high it overcomes the bleed effect of valve 418 and begins to reduce the pressure in chamber 42. This reduction in pressure is also transmitted through conduit 456 to Bourdon tube 460, causing that tube to contract and its end 462 to rotate plate 464. The rotating movement of plate 464 moves valve 468 so that it closes orifice 470. This creates a greater reduction in pressure in chamber 428 since the pump no longer has to overcome the bleed of orifice 470 in addition to the bleed of valve 418. This further reduction in pressure causes Bourdon tube 460 to move valve 468 until it begins to open orifice 470. At the same time, with valve 468 closed, the reduction in pressure acting in chamber 42 moves diaphragm 40 to open throttle valve 16, thus increasing the vehicle speed. This in turn increases the speed of rotation of cam 436, further reducing the pressure in chamber 428. The system is so calibrated that when it reaches the speed set by valve 418 orifice 470 is sufficiently open to balance the pressure in chamber 42 against the throttle return spring 30 and hold throttle valve 16 open at the proper opening to maintain the vehicle speed. The system reacts in the same manner as does the system of FIGURE 1.

The vehicle operator may disengage the speed control system by moving brake lever 100 to open spoiler valve 108. This lets air under atmospheric pressure into conduit 60 and chamber 42 so that the servo 36 no longer acts to hold throttle valve 16 open. This also permits a higher absolute pressure in chamber 428 and that pressure acts through Bourdon tube 460 to rotate valve 468 in the other direction so the orifice 470 is first momentarily closed then reopened. Further details of operation of a valve similar to valve 468 are found in the above noted application. The description in that application explains in greater detail the manner in which the orifice controlled by the valve opens and closes upon speed changes.

By referring to the above description of operation it can be seen that methods of producing fluid pressure variations throughout a predetermined pressure range of a fluid pressure have been disclosed. With particular reference to the modification of FIGURE 1 the pump 302 generates a fluid pressure and the engine 10 generates another fluid pressure in the intake manifold. As the pressure from pump 302 increases and acts on Bourdon tube 320, valve 328 is moved to close orifice 330 in accordance with the pressure sensed by the Bourdon tube. This more restrictively vents the servo chamber 42, resulting in an increase in the amount of vacuum in that chamber, or a reduction in the absolute pressure in that chamber. As the pressure in Bourdon tube 320 increases to a greater extent, valve 328 closes then begins to open orifice 330. Since this is providing a greater venting action to chamber 42, the vacuum in that chamber decreases, or the absolute pressure increases. The pressure in chamber 42 therefore varies throughout a first range of pressure sensed by tube 320 to increase and throughout a continuing second range of increase in pressure sensed by the tube 320 to decrease.

The method of producing a modified fluid pressure disclosed in FIGURE 2 is similar. A fluid pressure is generated by speed responsive action of the pump diaphragm 424. Since the valve 468 is initially positioned so that orifice 470 is open, diaphragm 424 must be actuated at a minimum speed of cam 436 which will pump more fluid out of chamber 428 than can be replaced by the bleeding action of orifice 470, in order to begin generation of the fluid pressure. Once this pressure generation is commenced, the pressure is sensed by Bourdon tube 460 which moves valve 468 to varibly close orifice 470 as the generated pressure increases so as to aid in the pressure increasing action of the diaphragm 424 since the pressure being generated by movement of diaphragm 424 is below atmospheric. The generated pressure then increases at a faster rate than the rate of speed increase of cam 436. As the vacuum further increases and is sensed by tube 460 orifice 470 is closed and then opened in accordance with the pressure sensed by the tube. As orifice 470 is so opened, it provides an increasing bleed action which dilutes the pressure generation rate so that the pressure generation rate is a slower rate than the speed increasing rate of cam 436. This provides a degenerative control of the generated pressure in this part of the range of pressure generation in accordance with the sensing of the generated pressure by the tube 460 since a greater vent area is being provided, as compared to the regenerative control of the generated pressure in the earlier occurring part of the range of pressure generation in accordance with the sensing of the generated pressure by the tube 460, when the vent area is being decreased.

What is claimed is:

1. Mechanism for producing a fluid pressure speed error signal having a predetermined variable zero speed error value varying in accordance with the speed of an element, said mechanism comprising, a fluid pressure generator driven in accordance with the speed of said element and producing a fluid pressure reflecting element speed, means sensing the fluid pressure generated by said generator and within a range of fluid pressure generation and modifying the generated fluid pressure in accordance with changes in the generated fluid pressure, and means for further modifying the modified fluid pressure including pressure venting means set at a predetermined element speed to produce a fluid pressure reflective of speed error.

2. The mechanism of claim 1, said sensing and modifying means including a pressure actuated valve and an orifice controlled thereby normally restrictively venting fluid pressure generated by said generator until the generated fluid pressure is sufficient to actuate said valve to provide a continuous orifice controlling valve movement first closing said orifice and then variably opening said orifice to provide first regenerative and then degenerative feedback to said generating fluid pressure within the range of modification of fluid pressure generation.

3. Fluid pressure producing means for producing a fluid pressure output in response to the speed of an element and having the characteristic of being substantially zero until a predetermined element speed is reached and increasing at a rate faster than the rate of element speed increase for a first element speed increasing range and increasing at a rate slower than the rate of element speed increase for a second element speed increasing range, and comprising a housing having a first wall and a second wall dividing said housing into a first chamber defined in part by said first wall and a second chamber defined in part by said first and second walls and a third chamber defined in part by said second wall, said second wall being movable, element speed responsive means for moving said second wall to alternately increase and decrease the volumes of said second and third chambers, first check valve means in said second wall permitting fluid flow only from said second chamber to said third chamber and second check valve means in said housing permitting fluid flow only from said third chamber, vent means in said housing venting said first chamber, orifice means in said first wall interconnecting said first and second chambers, fluid pressure actuable means sensitive to fluid pressure in said second chamber, valve means actuated by said pressure actuable means to continuously vary the effective area of said orifice means from a maximum orifice open area to fully close said orifice means to increase the fluid pressure output increase rate from said second chamber when the fluid pressure in said second chamber changes with increasing element speed to overcome the venting effect of said orifice means and actuates said fluid pressure actuable means, said fluid pressure actuable means further actuating said valve means to continuously vary the effective area of said orifice means from a fully closed orifice to a maximum orifice open area in response to further element speed increase to decrease the fluid pressure output increase rate from said second chamber, and a fluid pressure output connected with said second chamber.

4. A method of producing a modified fluid pressure to conform to a preselected fluid pressure, said method comprising the steps of generating a variable fluid pressure over a predetermined fluid pressure range, sensing the generated fluid pressure, regeneratively controlling the generated fluid pressure in a chronologically-occurring first part of the predetermined generated fluid pressure range and degeneratively controlling the generated fluid pressure in a chronologically later occurring second part of the predetermined generated fluid pressure range, both the regeneratively controlling and degeneratively controlling steps being in accordance with the sensing of the generated fluid pressure, thereby modifying the generated fluid pressure to conform to the preselected fluid pressure.

(References on following page)

References Cited by the Examiner

UNITED STATES PATENTS

| | | | |
|---|---|---|---|
| 1,854,709 | 4/32 | Mathieson | 137—494 |
| 2,116,992 | 5/38 | Weaver | 137—47 |
| 2,157,472 | 9/39 | Bellis | 137—58 |
| 2,324,191 | 7/43 | Bowers | 180—82.1 X |
| 2,332,627 | 10/43 | Erbguth | 180—82.1 X |
| 2,367,606 | 1/45 | Olson | 180—82.1 X |
| 2,708,979 | 5/55 | Reynoldson | 180—82.1 |
| 2,737,165 | 3/56 | Thorner | 123—103 |
| 2,990,825 | 7/61 | Fuller et al. | 123—103 |
| 3,072,111 | 1/63 | Cramer | 180—82.1 |
| 3,081,757 | 3/63 | Cramer | 180—82.1 |
| 3,099,329 | 7/63 | Von Berg et al. | 180—82.1 |
| 3,099,995 | 8/63 | Raufenbarth | 137—82 |
| 3,132,711 | 5/64 | McMurray | 180—82.1 |
| 3,133,610 | 5/64 | Sheppard | 123—103 X |

BENJAMIN HERSH, *Primary Examiner.*

PHILIP ARNOLD, KENNETH H. BETTS, MILTON BUCHLER, *Examiners.*